US012767546B2

(12) United States Patent
Lew et al.

(10) Patent No.: US 12,767,546 B2
(45) Date of Patent: Oct. 20, 2026

(54) FERROSILICATE MTW MOLECULAR SIEVE, ITS SYNTHESIS AND USE

(71) Applicant: CHEVRON U.S.A. INC., San Ramon, CA (US)

(72) Inventors: Christopher Michael Lew, Alameda, CA (US); Rishabh Jain, San Ramon, CA (US); Cong-Yan Chen, Kensington, CA (US)

(73) Assignee: CHEVRON U.S.A. INC., San Ramon, CA (US)

( * ) Notice: Subject to any disclaimer, the term of this patent is extended or adjusted under 35 U.S.C. 154(b) by 612 days.

(21) Appl. No.: 18/165,387

(22) Filed: Feb. 7, 2023

(65) Prior Publication Data

US 2024/0270585 A1 Aug. 15, 2024

(51) Int. Cl.
*C01B 39/08* (2006.01)
*B01J 29/70* (2006.01)

(52) U.S. Cl.
CPC ......... *C01B 39/087* (2013.01); *B01J 29/7034* (2013.01); *C01P 2004/62* (2013.01)

(58) Field of Classification Search
None
See application file for complete search history.

(56) References Cited

U.S. PATENT DOCUMENTS 3,832,449 A 8/1974 Rosinski et al.
2010/0260665 A1 10/2010 Archer et al.
2022/0347663 A1 11/2022 Lew et al.

FOREIGN PATENT DOCUMENTS

EP 0013630 A1 7/1980
EP 0136068 A2 4/1985

OTHER PUBLICATIONS

Nakasaka et al. "Synthesis of Light Olefins from Oxygenated Organic Compounds over Metallosilicates with MFI and MTW-type Zeolite Structures", Journal of the Japan Petroleum Institute, 60, (6), 277-287 (2017) (Year: 2017).*
Kahle et al. "Functional mesoporous aluminosilicate nanoparticles as host material to fabricate photo-switchable polymer films", J. Mater. Chem., 2011, 21, 5083 (Year: 2011).*
Feng et al. "A first principle study on Fe incorporated MTW-type zeolite", Microporous and Mesoporous Materials 199 (2014) 83-92 (Year: 2014).*
Vinaches et al. "An Introduction to Zeolite Synthesis Using Imidazolium-Based Cations as Organic Structure-Directing Agents", Molecules 2017, 22, 1307 (Year: 2017).*

(Continued)

*Primary Examiner* — Keling Zhang
(74) *Attorney, Agent, or Firm* — Terrance Flaherty

(57) ABSTRACT

A ferrosilicate molecular sieve of MTW framework having a d50 crystal size of 0.5 microns or less is provided. The ferrosilicate molecular sieve may be synthesized by forming a reaction mixture containing a source of iron, a source of silicon, a source of an alkali metal, a structure directing agent containing 1,3-diisobutylimidazolium cations, a source of hydroxide ions, and water; and subjecting the reaction mixture to crystallization conditions sufficient to form crystals of the ferrosilicate molecular sieve. The ferrosilicate molecular sieve may be used in organic compound conversion and absorptive processes.

4 Claims, 3 Drawing Sheets

(56) References Cited

OTHER PUBLICATIONS

PCT International Search Report, International application No. PCT/US2024/012123, mailed May 28, 2024.
C.M. Lew, C-Y. Chen, G.J. Long, F. Grandjean, A.S. Ichimura, D. Xie, N.A. Grosso-Giordano, K. Chakarawet, H.S. Lacheen, K.O. Jensen, A. Martinez, A. Katz, B-Z. Zhan and S.I. Zones "Synthesis, Physicochemical Characterization, and Catalytic Evaluation of Fe3+-Containing SSZ-70 Zeolite" ACS Catalysis 2022, 12, 11, 6464-6477.
R.H. Archer, S.I. Zones and M.E. Davis "Imidazolium structure directing agents in zeolite synthesis: Exploring guest/host relationships in the synthesis of SSZ-70" Micropor. Mesopor. Mater. 2010, 130, 255-265.

* cited by examiner

FERROSILICATE MTW MOLECULAR SIEVE, ITS SYNTHESIS AND USE

FIELD

This disclosure relates to a ferrosilicate molecular sieve of MTW framework topology, its synthesis and its use as an adsorbent and as a catalyst for organic compound conversion reactions, particularly hydrocarbon conversion reactions.

BACKGROUND

Molecular sieve materials are classified by the Structure Commission of the International Zeolite Association (IZA) according to the rules of the IUPAC Commission on Zeolite Nomenclature. According to this classification, framework type zeolites and other crystalline microporous crystalline materials for which a structure has been established are assigned a three-letter code and are described in the Database of Zeolite Structures maintained by the IZA (www.iza-structure.org/databases/).

One known molecular sieve for which a structure has been established is the material designated as MTW, which is a molecular sieve having a unique one-dimensional system of 12-membered (12-MR) ring pores. Examples of MTW framework type molecular sieves include CZH-5, NU-13, Theta-3, TPZ-12 and ZSM-12. Aluminosilicate ZSM-12 is of significant commercial interest because of its activity as a shape-selective acid catalyst in industrial hydrocarbon conversion processes such as alkylation and disproportionation of aromatics, hydroisomerization of linear alkanes and cracking of hydrocarbons.

While the one-dimensional pore system provides aluminosilicate ZSM-12 with unique shape-selective properties, it can also lead to significant diffusion limitations for reactants and products. For chemical reactions where diffusivity is critical, having a smaller crystal size provides a shorter diffusion path and therefore, enhances the mass transfer, improving the desired reaction pathways with a positive impact on the selectivity and conversion of such reactions.

For acid catalysis, the silica-to-alumina molar ratio is an important chemical property of molecular sieves. Although in general high acidity benefits the overall catalytic activity, the presence of Brönsted acid sites (e.g., those formed at framework AI atoms) can catalyze secondary reactions that are detrimental to the desired chemistry. For instance, the hydroisomerization of linear alkanes with aluminosilicate ZSM-12 can result in undesirable overcracking which decreases yields of isomerized alkanes. One strategy to overcome acidity limitations is to decrease acidity by isomorphic substitution of framework aluminum atoms with metal atoms having an acid strength less than aluminum. Current methods for the synthesis of aluminum-free ZSM-12 generally rely on the post-synthetic modification of aluminosilicate ZSM-12. These methods include steaming at high temperatures or acid treatments to partially remove aluminum from framework positions and create vacant silanol nest ($[SiOH]_4$) defects that can be substituted with the desired metal atoms. However, a significant amount of framework aluminum can remain and can be detrimental for a number of relevant reactions and can lead to significant reductions in yields and selectivities.

Consequently, there is an ongoing need for molecular sieve materials of MTW framework topology with improved properties, in particular with respect to catalytic properties for use in a variety of applications and in particular for use in hydrocarbon conversion reactions, such as isomerization of linear alkanes.

According to the present disclosure, ferrosilicate molecular sieves of MTW framework topology can be directly synthesized using 1,3-diisobutylimidazolium cations as a structure directing agent, and, in some cases, it has been found that small crystal forms of the molecular sieve can be produced.

SUMMARY

In one aspect there is provided a ferrosilicate molecular sieve of MTW framework topology having a d50 crystal size of 0.5 microns or less.

In another aspect, there is provided a method of making a ferrosilicate molecular sieve of MTW framework topology. The method comprises: (1) forming a reaction mixture comprising: (a) a source of iron; (b) a source of silicon; (c) a source of an alkali metal [M]; (d) a structure directing agent [Q] comprising 1,3-diisobutylimidazolium cations; (e) a source of hydroxide ions; and (f) water; and (2) subjecting the reaction mixture to crystallization conditions sufficient to form crystals of the ferrosilicate molecular sieve.

In yet another aspect, there is provided a process for converting a feedstock comprising an organic compound to a conversion product which comprises contacting the feedstock at organic compound conversion conditions with a catalyst, the catalyst comprising a ferrosilicate molecular sieve of MTW framework topology having a d50 crystal size of 0.5 microns or less.

DETAILED DESCRIPTION

Definitions

Figure 1:
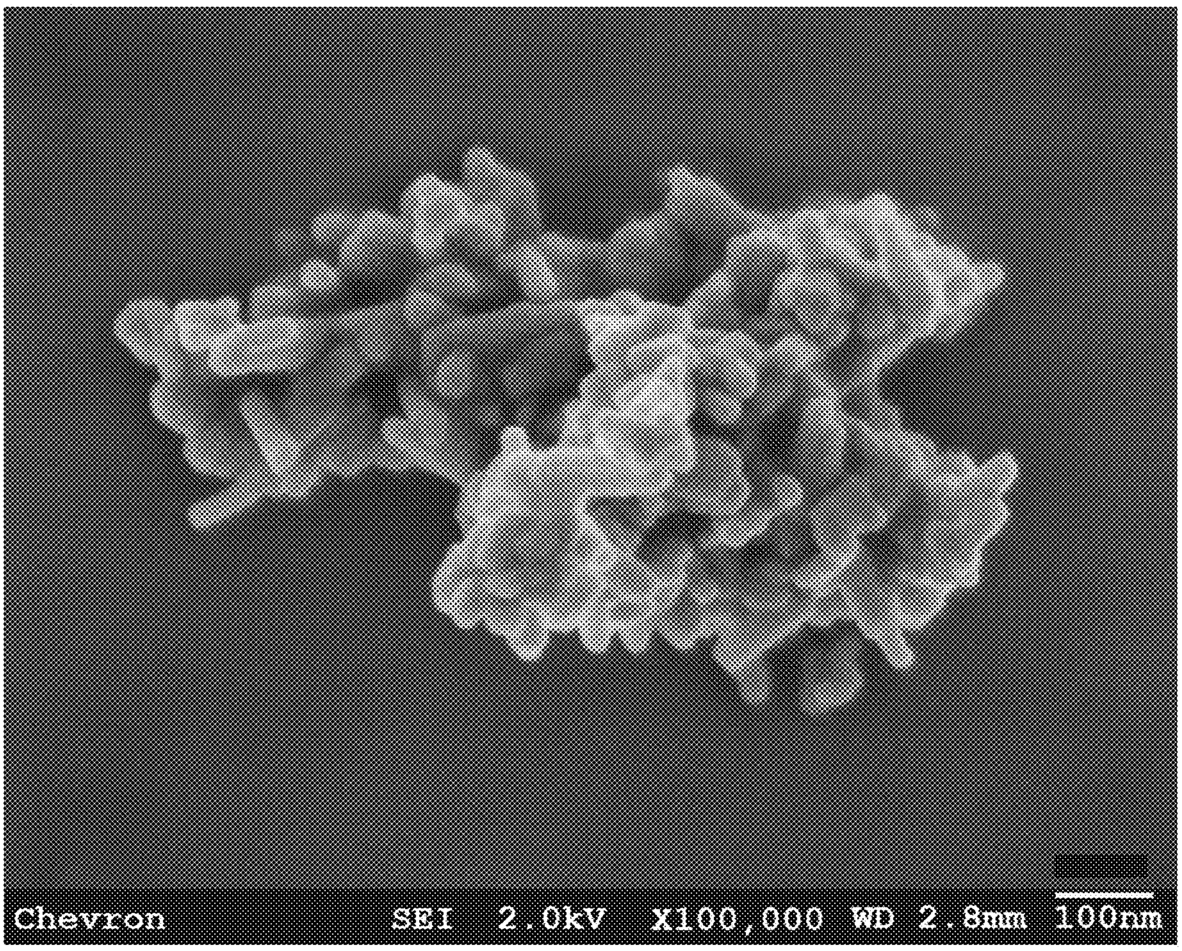
FIG. 1 shows a Scanning Electron Micrograph (SEM) image of the as-made ferrosilicate MTW product of Example 1.

The term “ferrosilicate” means a molecular sieve having a framework constructed of repeating FeO4 and SiO4 tetrahedral units.

The term “MTW” refers to the MTW type topology or framework as recognized by the International Zeolite Association (IZA) Structure Commission and the term “MTW molecular sieve” means a crystalline microporous material in which the primary crystalline phase is MTW.

The term “as-made” refers to a molecular sieve in its form after crystallization, prior to removal of the structure directing agent.

The term “extra-framework metal” refers to a metal that resides on the surface of and/or within the cages and/or pores of a molecular sieve and does not include atoms constituting the framework of the molecular sieve.

The term “Cn” hydrocarbon means a hydrocarbon compound having n number of carbon atom(s) per molecule. The term “Cn+” hydrocarbon means a hydrocarbon compound having n or more than n carbon atom(s) per molecule. The term "Cn-" hydrocarbon means a hydrocarbon compound having no more than n carbon atom(s) per molecule.

Synthesis of the Molecular Sieve

A ferrosilicate molecular sieve of MTW framework topology can be synthesized by: (1) forming a reaction mixture comprising: (a) a source of iron; (b) a source of silicon; (c) source of an alkali metal [M]; (d) a structure directing agent [Q] comprising 1,3-diisobutylimidazolium cations; (e) a source of hydroxide ions; and (f) water; and (2) subjecting the reaction mixture to crystallization conditions sufficient to form crystals of the ferrosilicate molecular sieve.

The reaction mixture can have a composition, in terms of molar ratios, within the ranges set forth in Table 1:

TABLE 1

| | Broadest | Secondary |
|---|---|---|
| $SiO_2/Fe_2O_3$ | 50 to 500 | 75 to 250 |
| $M_2O/SiO_2$ | 0.01 to 0.50 | 0.01 to 0.30 |
| $Q/SiO_2$ | 0.05 to 0.50 | 0.10 to 0.30 |
| $OH/SiO_2$ | 0.05 to 1.00 | 0.10 to 0.60 |
| $H_2O/SiO_2$ | 5 to 80 | 10 to 50 |

wherein M is an alkali metal and Q represents 1,3-diisobutylimidazolium cations.

Suitable sources of iron include iron(III) salts. In some aspects, organic iron(III) salts can be used, such as iron(III) acetate, iron(III) citrate and iron(III) oxalate. In some aspects, inorganic iron(III) salts can used, such as iron(III) halides, iron(III) nitrates, and iron(III) sulfates. If desired, combinations of two or more different iron(III) salts can be used. In particular aspects, the iron(III) salt can be iron(III) nitrate and/or iron(III) sulfate.

Suitable sources of silicon include colloidal silica, precipitated silica, fumed silica, alkali metal silicates, tetraalkyl orthosilicates (e.g., tetraethyl orthosilicate), and any combination thereof.

The alkali metal [M] can be lithium, sodium, potassium, rubidium, cesium, or any combination thereof. The alkali metal is preferably sodium or potassium, preferably sodium. Suitable alkali metal sources include alkali metal hydroxides, such as sodium hydroxide or potassium hydroxide.

The structure directing agent (Q) comprises 1,3-diisobutylimidazolium cations, represented by the following structure (1):

(1)

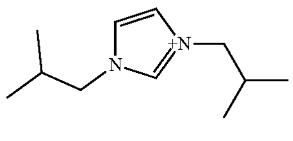

Suitable sources of Q include the hydroxides, chlorides, bromides, and/or other salts of the quaternary ammonium compound.

The reaction mixture can further comprise seed crystals of a crystalline molecular sieve material, such as a crystalline molecular sieve of MTW framework topology, from a previous synthesis. The amount of seed crystals is not particularly limited and typically corresponds to 0.1 o 25 wt. % (e.g., 0.1 to 10 wt. %), based on a total weight of silica in the reaction mixture. Seeding can be advantageous in decreasing the time necessary for complete crystallization to occur and/or to minimize the formation of other crystalline impurities.

The reaction mixture components can be supplied by more than one source. Also, two or more reaction mixture components can be provided by one source.

The reaction mixture can be prepared by any conceivable means, wherein mixing by agitation is preferred, preferably by means of stirring. The reaction mixture can be prepared in batch, continuous, or semi-continuous mode.

The reaction mixture can be in the form of a solution, a colloidal dispersion (colloidal sol), gel, or paste, with a gel being preferred.

Crystallization and Post-Synthesis Treatment

Crystallization of the molecular sieve from the reaction mixture may be carried out under static or stirred conditions in a suitable reactor vessel, such as for example, polypropylene jars or Teflon lined or stainless steel autoclaves placed in a convection oven maintained at a temperature of from 100° C. to 200° C. for a period of time sufficient for crystallization to occur (e.g., about 1 day to 21 days, or about 1 day to 10 days). Preferably, the crystallization is carried out under autogenous pressure, preferably in an autoclave.

Once the desired molecular sieve crystals have formed, the solid product can be separated from the reaction mixture by standard mechanical separation techniques such as centrifugation or filtration. The recovered crystals are water-washed and then dried, for several seconds to a few minutes (e.g., 5 seconds to 10 minutes for flash drying) or several hours (e.g., 4 hours to 24 hours for oven drying at 75° C. to 150° C.), to obtain the as-made molecular sieve crystals. The drying step can be performed under vacuum or at atmospheric pressure.

As a result of the crystallization process, the recovered crystalline molecular sieve product contains within its pores at least a portion of the structure directing agent used in the synthesis.

The as-made molecular sieve may further be subjected to thermal treatment, ozone treatment, or other treatments to remove all or part of the structure directing agent used in its synthesis. Thermal treatment (e.g., calcination) may be carried out in any manner conventionally known in the art. For example, the as-made molecular sieve can be calcined at a temperature of from 300° C. to 800° C. (e.g., 400° C. to 650° C.) for a period of time ranging from 1 hour to 10 hours (e.g., 3 hours to 6 hours). In addition, the calcination is generally carried out in an oxygen-containing atmosphere, such as air or oxygen atmosphere.

Molecular sieves synthesized by the methods described include one or more extra-framework alkali metal cations (e.g., $Na^+$). Usually, it is desirable to remove the extra-framework alkali metal cation from the molecular sieve by ion exchange or other known techniques and replace it with hydrogen, ammonium, or any desired metal ion. Particularly preferred cations are those which tailor the catalytic activity for certain hydrocarbon conversion reactions. These include hydrogen, rare earth metals and metals of Groups 2 to 15 of the Periodic Table of the Elements. The amount of metal can be in a range of from 0.001 to 20% by weight (e.g., 0.01 to 10% by weight, or 0.1 to 5.0% by weight) of catalyst.

Characterization of the Molecular Sieve

Ferrosilicate MTW molecular sieves synthesized by the methods described herein can have a $SiO_2/Fe_2O_3$ molar ratio of at least 50 (e.g., 50 to 500, or 50 to 250, or 50 to 125, or 75 to 500, or 75 to 250, or 75 to 125). The $SiO_2/Fe_2O_3$ molar ratio of molecular sieves may be determined by conventional analysis.

The synthesis methods described herein can produce ferrosilicate MTW crystals with a high degree of purity, and preferably are pure phase. As used herein, the term "pure phase" means that the ferrosilicate MTW molecular sieve composition can comprise at least 95% by weight (e.g., at least 97% by weight or at least 99% by weight) of molecular sieve with MTW topology, based on the total weight of the composition, as determined by powder XRD or NMR, or by other known methods for such determination. The remainder of the composition is non-MTW material which can include amorphous material, different crystalline phases, different framework types, or any combination thereof.

Crystals of the ferrosilicate MTW molecular sieves produced in accordance with the methods described herein can be uniform, with little or no twinning and/or multiple twinning or may form agglomerates.

Ferrosilicate MTW molecular sieves prepared as described herein can have a small crystal size. Ferrosilicate MTW molecular sieve crystals can have a d50 crystal size that is 0.5 microns or less (e.g., 0.2 microns or less, or 0.1 microns or less, or from 0.05 to 0.5 microns, from 0.05 to 0.1 microns, or from 0.1 to 0.25 microns). More preferably, ferrosilicate MTW molecular sieve crystals have a d90 crystal size that is 0.5 microns or less, (e.g., 0.2 microns or less, or 0.1 microns or less, or from 0.05 to 0.5 microns, or from 0.05 to 0.1 microns, or from 0.1 to 0.25 microns). Ferrosilicate MTW crystals may have both a d50 and a d90 value as described above.

The crystal size is based on individual crystals. Crystal size is the length of longest diagonal of the three-dimensional crystal. Direct measurement of the crystal size can be performed using microscopy methods, such as SEM and TEM. For example, measurement by SEM involves examining the morphology of materials at high magnifications (typically 1000× to 100,000×). The SEM method can be performed by distributing a representative portion of the molecular sieve powder on a suitable mount such that individual particles are reasonably evenly spread out across the field of view at 1000× to 100,000× magnification. From this population, a statistically significant sample of random individual crystals (e.g., 50-200) are examined and the longest diagonal of the individual crystals are measured and recorded. (Particles that are clearly large polycrystalline aggregates should not be included the measurements.) Based on these measurements, the d50 and d90 of the sample crystal sizes is calculated.

The ferrosilicate MTW molecular sieves synthesized as described herein are characterized by their powder XRD pattern. Powder XRD patterns representative of MTW molecular sieves can be referenced in "Collection of Simulated XRD Powder Patterns for Zeolites" by M. M. J. Treacy and J. B. Higgins (Elsevier, Fifth Revised Edition, 2007).

The powder X-ray diffraction data reported herein were collected by standard techniques using copper K-alpha radiation. Minor variations in the diffraction pattern can result from variations in the mole ratios of the framework species of the particular sample due to changes in lattice constants. In addition, sufficiently small crystals will affect the shape and intensity of peaks, leading to significant peak broadening. Minor variations in the diffraction pattern can also result from variations in the organic compound used in the preparation. Calcination can also cause minor shifts in the XRD pattern. Notwithstanding these minor perturbations, the basic crystal lattice structure remains unchanged.

Uses of Ferrosilicate MTW Molecular Sieves

The ferrosilicate MTW molecular sieve (wherein part or all of the structure directing agent is removed) may be used as an adsorbent or as a catalyst to catalyze a wide variety of organic compound conversion processes. Examples of chemical conversion processes, which are effectively catalyzed by the ferrosilicate MTW molecular sieves described herein, either alone or in combination with one or more other catalytically active substances (including other crystalline catalysts), include those requiring a catalyst with acid activity. Examples of organic conversion processes which may be catalyzed by the ferrosilicate MTW molecular sieves described herein include cracking, hydrocracking, disproportionation, alkylation, oligomerization, and isomerization.

The ferrosilicate MTW molecular sieve (wherein part or all of the structure directing agent is removed) may be incorporated with another material resistant to the temperatures and other conditions employed in organic conversion processes. Such resistant materials may be selected from active materials, inactive materials, synthetic zeolites, naturally occurring zeolites, inorganic materials or a mixture thereof. Examples of such resistant materials may be selected from clays, silica, metal oxides such as alumina, or a mixture thereof. The inorganic material may be either naturally occurring, or in the form of gelatinous precipitates or gels, including mixtures of silica and metal oxides. Use of a resistant material in conjunction with a ferrosilicate MTW molecular sieve (i.e., combined therewith or present during synthesis of the as-made ferrosilicate MTW crystal, which crystal is active) tends to change the conversion and/or selectivity of the catalyst in certain organic conversion processes. Inactive resistant materials suitably serve as diluents to control the amount of conversion in a given process so that products can be obtained in an economic and orderly manner without employing other means for controlling the rate of reaction. These materials may be incorporated into naturally occurring clays (e.g., bentonite and kaolin) to improve the crush strength of the catalyst under commercial operating conditions. The inactive resistant materials (i.e., clays, oxides, etc.) function as binders for the catalyst. A catalyst having good crush strength can be beneficial because in commercial use, it is desirable to prevent the catalyst from breaking down into powder-like materials.

Naturally occurring clays which may be composited with ferrosilicate MTW molecular sieve include the montmorillonite and kaolin family, which families include the subbentonites, and the kaolins commonly known as Dixie, McNamee, Georgia and Florida clays or others in which the main mineral constituent is halloysite, kaolinite, dickite, nacrite, or anauxite. Such clays may be used in the raw state as originally mined or initially subjected to calcination, acid treatment or chemical modification. Binders useful for compositing with the ferrosilicate MTW molecular sieve also include inorganic oxides selected from silica, zirconia, titania, magnesia, beryllia, alumina, or a mixture thereof.

The ferrosilicate MTW molecular sieve (wherein part or all of the structure directing agent is removed) may be composited with a porous matrix material such as silica-alumina, silica-magnesia, silica-zirconia, silica-thoria, silica-beryllia, silica-titania as well as ternary compositions such as silica-alumina-thoria, silica-alumina-zirconia, silica-alumina-magnesia, and silica-magnesia-zirconia.

The relative proportions of the ferrosilicate MTW molecular sieve and inorganic oxide matrix may vary widely, with the ferrosilicate MTW content ranging from 1 to 90% by weight (e.g., 2 to 80% by weight) of the composite.

EXAMPLES

The following illustrative examples are intended to be non-limiting.

Example 1

Synthesis of Ferrosilicate MTW Molecular Sieve 0.62 g deionized water, 1.68 g NaOH solution (1 M), and 7.26 g 1,3-diisobutylimidazolium hydroxide solution (9 wt. %) were added to a Teflon liner and the solution was stirred until it was homogeneous. Then, 1.00 g fumed silica was added and the mixture was stirred until it was homogeneous. Finally, 0.14 g iron(III) nitrate nonahydrate was added. The final molar ratio of the gel was 1 $SiO_2$:0.01 $Fe_2O_3$: 0.1 NaOH: 0.2 1,3-diisobutylimidazolium hydroxide: $30H_2O$. The liner was placed into a stainless steel autoclave and was synthesized in a 150° C. oven with rotation for 7 days. The solid product was filtered, washed with excess deionized water, and dried in a 95° C. oven.

A SEM image of the as-made product is shown in FIG. 1.

The as-made material was calcined to 550° C. in flowing air for 5 hours to remove the organic structure directing agent [Q] using standard calcination protocol.

Figure 2:
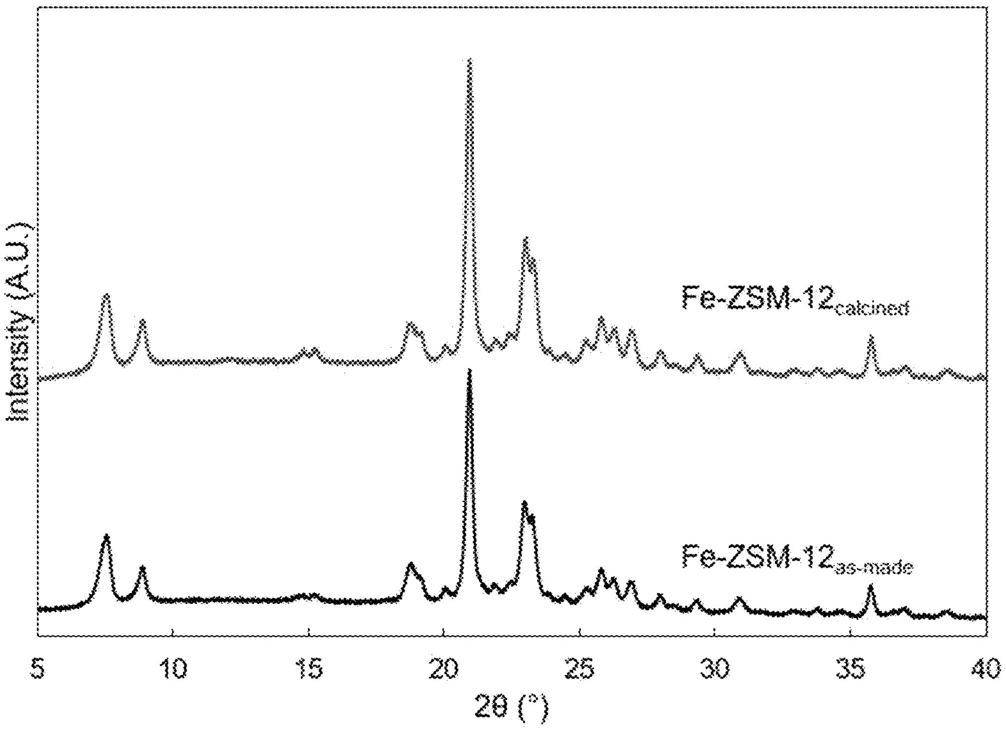
FIG. 2 shows the powder X-ray diffraction (XRD) patterns of as-made ferrosilicate MTW (top) and calcined ferrosilicate MTW (bottom) materials of Example 1.

The powder XRD patterns for the as-made product and the calcined product are shown in FIG. 2, confirming that the material synthesized was MTW.

The calcined material was then ion-exchanged to the $NH_4$-form by heating in a solution of ammonium nitrate (typically, 1 g $NH_4NO_3$/1 g molecular sieve in 10 mL deionized water at 95° C. for at least 2 hours). The molecular sieve was then filtered. This was repeated twice for a total of 3 exchanges. At the end, the molecular sieve was washed with deionized water to a conductivity of less than 50 μS/cm dried in air at 95° C. The resulting NH4-form molecular sieve was converted to the H-form by calcination using standard calcination protocol.

Analysis by n-propylamine temperature-programmed desorption showed that the product had an acid site density of 258 μmol $H^+$/g.

Analysis by inductively coupled plasma atomic emission spectroscopy (ICP-AES), showed that the product had a $SiO_2/Fe_2O_3$ molar ratio of 90.

Example 2

Constraint Index Testing

Constraint Index (CI) is a test describing the relative propensity of a material to crack linear alkanes versus branched alkanes. The competitive cracking of n-hexane versus 3-methylpentane was first described by V. J. Frillette et al. (J. Catal. 1981, 67, 218-222).

Calcined ferrosilicate MTW product (H-form) described in Example 1 was pelletized at 5 kpsi, crushed and granulated to 20-40 mesh. A 0.6 g sample of the granulated material was calcined in air at 540° C. for 4 hours and cooled in a desiccator to ensure dryness. Then, 0.47 g of material was packed into a % inch stainless steel tube with alundum on both sides of the molecular sieve bed. A furnace (Applied Test Systems, Inc.) was used to heat the reactor tube. Nitrogen was introduced into the reactor tube at 9.4 mL/min and at atmospheric pressure. The reactor was heated to about 900° F. (482° C.), and a feed of 50/50 n-hexane/3-methylpentane was introduced into the reactor at a rate of 8 μL/min. The feed was delivered by an ISCO pump. Direct sampling into a GC began after 15 minutes of feed introduction.

The ferrosilicate MTW catalyst exhibited a CI value of 1.

Example 3

Hydroconversion of n-Decane

Calcined ferrosilicate MTW product (NH4-form) described in Example 1 was impregnated with palladium at a loading of 0.5 wt. % using the required amount of tetraaminepalladium(II) nitrate dissolved in deionized water. The impregnated sample was washed to a conductivity of less than 50 μS/cm, dried and calcined in air at 482° C. for 3 hours. The resulting powdered catalyst material was pelletized at 5 kpsi, crushed and sieved to 20-40 mesh.

0.5 g of catalyst was charged into the center of a 23 inch-long×% inch outside diameter stainless steel reactor tube with alundum loaded upstream of the catalyst for preheating the feed. The run conditions were as follows: a total pressure of 1200 psig; a down-flow hydrogen rate of 8.3 mL/minute, when measured at 1 atmospheric pressure and 25° C.; and a down-flow n-decane feed rate of 0.66 $cm^3$/h. All materials were first reduced in flowing hydrogen at about 315° C. for 1 h. Products were analyzed by on-line capillary gas chromatography (GC) once every thirty minutes. Raw data from the GC was collected by an automated data collection/processing system and hydrocarbon conversions were calculated from the raw data.

Conversion is defined as the amount of n-decane reacted to produce other products (including iso-C10). Yields are expressed as mol % of products other than n-decane and include iso-C10 isomers as a yield product.

Figure 3:
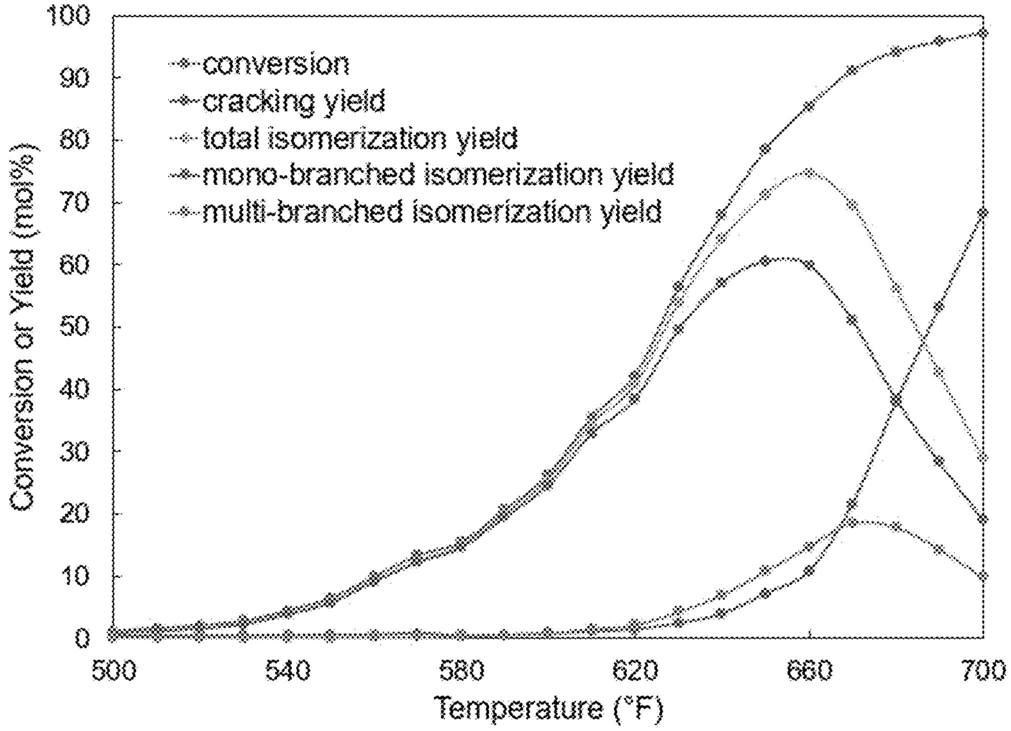
FIG. 3 is a plot of conversion as a function of temperature for n-decane conversion over the ferrosilicate MTW catalyst of Example 3.

Results for n-decane hydroconversion are presented in FIG. 3. The results show strong selectivity of the ferrosilicate MTW catalyst toward the isomerization of linear alkanes.

The invention claimed is:

1. A ferrosilicate molecular sieve of MTW framework topology having a d50 crystal size of 0.5 microns or less;

wherein the ferrosilicate molecular sieve comprises 1,3-diisobutylimidazolium cations in pores of the ferrosilicate molecular sieve; and wherein at least a portion of crystals of the ferrosilicate molecular sieve have a rod morphology.

2. The ferrosilicate molecular sieve of claim 1, having a $SiO_2/Fe_2O_3$ molar ratio of from 50 to 500.

3. The ferrosilicate molecular sieve of claim 1, having a $SiO_2/Fe_2O_3$ molar ratio of from 75 to 125.

4. The ferrosilicate molecular sieve of claim 1, having a d50 crystal size of from 0.05 to 0.25 microns and a d90 crystal size of less than 0.5 microns.

* * * * *